(12) United States Patent
Kirsten

(10) Patent No.: US 7,154,736 B2
(45) Date of Patent: Dec. 26, 2006

(54) CERAMIC MULTI-LAYER ELEMENT AND A METHOD FOR THE PRODUCTION THEREOF

(75) Inventor: Lutz Kirsten, Stallhof (AT)

(73) Assignee: EPCOS AG, Munich (DE)

( * ) Notice: Subject to any disclaimer, the term of this patent is extended or adjusted under 35 U.S.C. 154(b) by 48 days.

(21) Appl. No.: 10/474,492

(22) PCT Filed: May 8, 2001

(86) PCT No.: PCT/DE01/01736

§ 371 (c)(1),
(2), (4) Date: Oct. 8, 2003

(87) PCT Pub. No.: WO02/091408

PCT Pub. Date: Nov. 14, 2002

(65) Prior Publication Data

US 2004/0108041 A1 Jun. 10, 2004

(51) Int. Cl.
*H01G 4/06* (2006.01)
(52) U.S. Cl. .............. 361/321.4; 361/321.2; 361/321.3; 361/321.5
(58) Field of Classification Search ........... 361/321.2, 361/321.3, 321.4, 321.5, 15; 428/209, 210
See application file for complete search history.

(56) References Cited

U.S. PATENT DOCUMENTS

| | | | | |
|---|---|---|---|---|
| 3,612,963 A * | 10/1971 | Piper et al. | ............. | 361/321.3 |
| 3,679,950 A | 7/1972 | Rutt | | |
| 4,831,432 A | 5/1989 | Hori et al. | | |
| 5,004,715 A | 4/1991 | Hakotani et al. | | |
| 5,500,996 A * | 3/1996 | Fritsch et al. | ............... | 29/612 |
| 5,853,515 A * | 12/1998 | Sano et al. | ............. | 156/89.16 |
| 5,879,812 A | 3/1999 | Nishiyama et al. | | |
| 6,080,328 A | 6/2000 | Horikawa | | |
| 6,143,109 A * | 11/2000 | Sano et al. | ............. | 156/89.16 |
| 6,159,267 A | 12/2000 | Hampden-Smith et al. | | |
| 6,295,196 B1 * | 9/2001 | Hamaji et al. | ........... | 361/321.2 |
| 6,320,738 B1 | 11/2001 | Yamana et al. | | |
| 6,346,497 B1 * | 2/2002 | Nakamura et al. | .......... | 501/138 |
| 6,359,327 B1 * | 3/2002 | Niimi et al. | ................ | 257/613 |
| 6,447,571 B1 * | 9/2002 | Ito et al. | ....................... | 75/255 |
| 6,503,609 B1 | 1/2003 | Lobl et al. | | |
| 6,510,040 B1 * | 1/2003 | Sato et al. | .............. | 361/321.4 |
| 6,522,237 B1 | 2/2003 | Ito et al. | | |
| 6,542,067 B1 * | 4/2003 | Kawamoto | ................ | 338/22 R |
| 6,620,220 B1 * | 9/2003 | Ito et al. | ...................... | 75/362 |
| 6,621,682 B1 * | 9/2003 | Takakuwa et al. | ....... | 361/306.3 |

(Continued)

FOREIGN PATENT DOCUMENTS

CN 1148724 4/1997

(Continued)

OTHER PUBLICATIONS

English translation of "Pre-Notification of Reasons for the Possible Rejection of the Pending Patent Re-Examination" for TW No. 90111699.

(Continued)

*Primary Examiner*—Cathy F. Lam
(74) *Attorney, Agent, or Firm*—Fish & Richardson P.C.

(57) ABSTRACT

A method of manufacturing a ceramic component having multiple layers includes producing ceramic green foil comprised of PTC ceramic material, applying electrode paste containing tungsten onto areas of the ceramic green foil designated to be electrodes, alternately stacking a number of ceramic green foils with electrode paste to produce a foil stack, compressing the foil stack, and sintering the foil stack to produce a component body.

14 Claims, 2 Drawing Sheets

U.S. PATENT DOCUMENTS 6,863,708 B1 * 3/2005 Kagohashi et al. ........... 75/364

FOREIGN PATENT DOCUMENTS

| | | |
|---|---|---|
| CN | 1273423 | 11/2000 |
| DE | 38 30 174 | 6/1992 |
| DE | 196 20 446 | 11/1996 |
| DE | 196 22 690 | 12/1996 |
| DE | 197 19 174 | 11/1998 |
| DE | 197 19 174 A1 | 11/1998 |
| DE | 199 16 380 | 10/1999 |
| DE | 199 02 769 | 7/2000 |
| DE | 199 45 011 | 5/2001 |
| EP | 0 514 149 | 11/1992 |
| EP | 0 734 031 | 9/1996 |
| EP | 1 022 769 A2 | 7/2000 |
| JP | 08/153605 | 6/1996 |
| WO | 01/33589 A1 | 5/2001 |
| WO | 02/091408 A1 | 11/2002 |

OTHER PUBLICATIONS

Copy of Office Action dated Jul. 7, 2006 for corresponding Chinese Application No. 01823237.X.

* cited by examiner

CERAMIC MULTI-LAYER ELEMENT AND A METHOD FOR THE PRODUCTION THEREOF

FIELD OF THE INVENTION

The invention relates to a ceramic multilayer component according to the introductory clause of claim 1, as well as a method of manufacturing the component.

Such a component is known from EP 0734031A2. This type of component comprises a monolithic ceramic component body made of a perovskite ceramic material that has a multilayer structure consisting of alternating ceramic and electrode layers. The interior electrodes, which are based on nickel or nickel alloys, are alternately connected to collector electrodes attached to the exterior of the component body. The component is structured as a varistor.

A ceramic multilayer component that can be used as a capacitor is known from U.S. Pat. No. 3,679,950. This component also features alternating ceramic and electrode layers, wherein the electrode layers are alternately bonded with two collector electrodes laterally connected to the component body. During the production of the ceramic component, the electrode layers are initially pre-manufactured as intermediate porous ceramic layers and only afterwards impregnated with conductive material, such as silver in a silver nitrate melt or in a melt of a BiPbSnCd alloy.

With the exception of the complex process mentioned above, the only ceramic/electrode combinations suitable for the production of ceramic multilayer components are those that survive sintering into dense ceramic component bodies at temperatures normally ranging from 1200–1500° C.

None of the temperature-stable electrodes made of precious metals that are normally used are suitable for use with ceramic posistors, i.e., components with a positive temperature coefficient of resistance, or so-called PTC elements. These components cannot develop an ohmic bond between the ceramic material and the metallic electrodes. Consequently, PTC elements with (interior) electrodes made of precious metal exhibit impermissibly high resistance. However, the non-precious metals suitable for use as electrode material generally do not survive the sintering process, which is necessary for the development of multilayer components.

DE 197 19 174 A1 discloses a ceramic posistor with a multilayer structure that features electrode layers comprising aluminum. These electrode layers develop an ohmic bond to the ceramic and can be sintered without damage at temperatures of up to 1200°. A disadvantage of this multilayer posistor component, however, is that the aluminum from the electrode layers partially diffuses into the ceramic material, thereby impairing the component properties in the medium or long-term or even rendering the component unusable.

DE 196 22 690 A1 discloses a ceramic multilayer component comprising a stack, bonded together to form a monolithic component body, of several ceramic layers provided with electrodes on both sides, wherein the electrode layers are alternately bonded with collector electrodes laterally connected to the component, and wherein the material of the interior electrode comprises tungsten.

SUMMARY

The object of the present invention is to specify a ceramic multilayer component with ceramic layers comprising PTC ceramic, wherein the component exhibits interior electrodes that are stable with respect to sintering and possesses component characteristics of long-term stability.

According to the invention, this object is achieved by a ceramic multilayer component of the type mentioned initially, in which the material, at least of the interior electrodes, comprises tungsten, and in which the ceramic layers comprise a PTC ceramic material.

Advantageous embodiments of the invention as well as a method for manufacturing the component follow from the additional claims.

It has been shown that electrodes made of tungsten or containing tungsten survive the sintering process necessary for the ceramic component without damage and, during this process, develop a favorable ohmic bond to the PTC ceramic material. Consequently, components with low resistance can be obtained with the invention. No diffusion processes of tungsten in the ceramic material that could impair the ceramic component characteristics are observed during sintering. This also applies to ceramic posistors, which also develop a favorable ohmic bond to the electrodes comprising tungsten without posistor characteristics being lost. At the same time, tungsten exhibits good electric conductivity, which is comparable with that of precious metals and is about three times as high for tungsten as for silver, so that electrode layers with adequate electric conductivity can already be achieved with thinner tungsten layers, as has thus far been possible with known non-precious electrode layers. Moreover, tungsten is a cost-effective electrode material which, for example, is significantly more cost-effective than precious metals such as palladium or platinum, so that the ceramic multilayer components of the invention can be manufactured more cost-effectively than those with electrodes containing metal. According to the invention, however, it is not the electric conductivity of tungsten, but rather removal of a blocking layer of posistor material, which is achieved only through the presence of a suitable amount of tungsten, that establishes a favorable ohmic bond.

A component of the invention formed as a PTC element, and therefore manufactured with a posistor ceramic material, provides additional benefits that have thus far been unachievable. Since no stable ceramic multilayer posistors have been known in the art until now, it is now possible to produce posistors with higher-rated currents and smaller component resistances in a smaller design than was possible in known (single-layer) posistor components. This is possible because, in the case of multilayer components, distances between electrodes and/or the thicknesses of ceramic layers can be smaller than in conventional posistor components without interior electrodes. As the thickness of the individual ceramic layer is reduced, its electric resistance is also reduced perpendicular to a main surface, i.e., in a direction of the layer thickness, without requiring a reduction in the specific resistance of the ceramic material. A further reduction in the resistance of the entire multilayer component results from the connection in parallel of individual PTC elements which, in the component of the invention, are stacked on top of one another to produce the multilayer component. This also ensures a high current carrying capacity of the component.

In a ceramic multilayer component, the characteristics of the total component can generally be specifically influenced or varied by varying the parameters of layer thickness and surface area of the individual element and the number of stacked individual layers in the multilayer component.

Therefore, the characteristics of a multilayer component with given external dimensions can nevertheless be varied within further limits without the need to change the composition of the ceramic material. In the case of single-layer ceramic components, the component characteristics can often be varied only through variation of the component dimension or variation of the materials used to make the component.

Thus, a ceramic multilayer component is especially suitable for use in SMD assembly technology, which requires a compact, machine-processable or machine-capable structural shape. This shape can be varied in any manner in the multilayer component, as the component characteristics can be adjusted independently thereof.

In the following, the invention, and particularly the method for manufacturing the component, are described in greater detail on the basis of exemplary embodiments and corresponding figures. The figures are provided for the sole purpose of illustrating the invention, and are only schematic and not dimensionally accurate.

DETAILED DESCRIPTION

To produce ceramic foil, a ceramic starting material is finely ground and homogeneously mixed with a binder material. The foil is then produced in its desired thickness by means of foil drawing or foil pouring.

Figure 1:
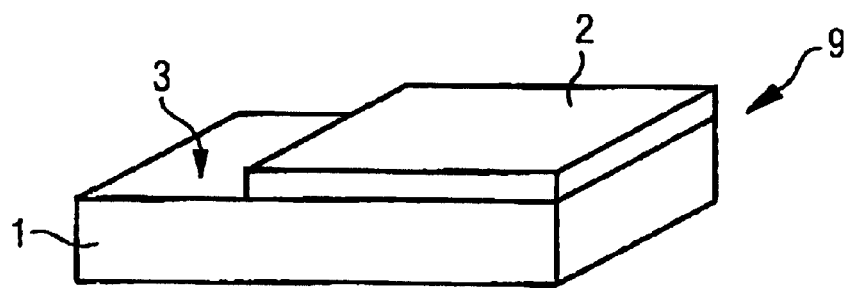
FIG. 1 depicts an exploded view of a ceramic green foil imprinted with an electrode layer.

FIG. 1 depicts such a green foil 1 in an exploded view. An electrode paste is now applied to a surface of the green foil 1 in the area designated for the electrode.

A number of thick-layer processes, preferably printing, such as by means of silk screen printing, are suitable for this purpose. An area of the surface not covered by electrode paste, and designated here as a passive area 3, remains in at least the region of one edge of the green foil 1, as depicted in FIG. 1, for example, or only in the region of one corner of the green foil. It is also possible not to apply the electrode as a flat layer, but rather as a structured and possibly intermittent pattern.

The electrode paste 2 consists of metallic particles comprising metallic tungsten or a tungsten compound, so as to provide the desired conductivity, and, if applicable, sinterable ceramic particles to adjust the shrinkage properties of the electrode paste to those of the ceramic material, and an organic binder, which can be burned off, so as to guarantee moldability of the ceramic material and/or cohesion of the green objects. Particles of pure tungsten or particles of tungsten alloy, tungsten compound or mixed particles of tungsten and other metals can be used in this process. In the case of ceramic multilayer components that are only subjected to minor mechanical stress, it is also possible to completely eliminate the ceramic components from the electrode paste. The tungsten component can vary within a wide range, wherein it may be necessary to adjust the sintering conditions to the composition of the electrode paste. The reduction in the blocking layer in posistor material is routinely achieved with tungsten particles of 3 or more percent in weight (relative to the metallic particles).

Subsequently, the desired number of imprinted green foils 9 are stacked on top of one another to form a stack of foils, such that (green) ceramic layers 1 and electrode layers 2 are arranged alternately on top of one another.

During the subsequent bonding process, the electrode layers are also alternately bonded to collector electrodes on different sides of the component, so as to connect the individual electrodes in parallel. To this end, it is advantageous to stack the first and second green foils 9 in different directions on the imprinted electrode layers 2 in such a way that their passive areas 3 alternately point in different directions. A uniform electrode geometry is preferably selected for this purpose, wherein the first and second green foil 9 differ from one another in that they are rotated by 180° relative to one another within the foil stack. It is also possible, however, to select a highly symmetrical outline for the component, so that rotation by angles other than 180° is possible to produce alternate bonding, e.g., by providing a square outline to enable 90° rotation. However, it is also possible to shift the electrode pattern on every second green foil 9 by a specific amount relative to that of the first green foil, so that each passive area 3 in the respective adjacent green foil is disposed over an area imprinted with electrode paste.

Subsequently, the foil stack, which is still elastic with respect to shape due to the binder, is transformed into the desired external shape by pressing and, if necessary, cutting it to size. Then the ceramic material is sintered, which can encompass a multi-stage process in an atmosphere that, at least initially, contains little oxygen. Final sintering, in which the ceramic material is sintered together until complete densification and/or desired densification is achieved, generally falls between 1100 and 1500° C. If an atmosphere containing oxygen (with, for example, a partial oxygen pressure of at least 1 hectopascal) is selected for this high-temperature sintering step, a maximum sintering temperature of 1200° C. is maintained. At temperatures above this level, there is a risk that the tungsten contained in the electrodes may oxidize, thereby reducing electric conductivity. If sintering is performed under inert gas (e.g., with an oxygen partial pressure of no more than 1 pascal), which is also possible, it is not necessary to maintain this upper temperature limit, so that sintering can also be performed at a temperature of 1300° C., which normally used with barium titanate, for example. However, a reduction in the required sintering temperature can also be achieved by selecting suitable additives to the ceramic material.

Figure 2:
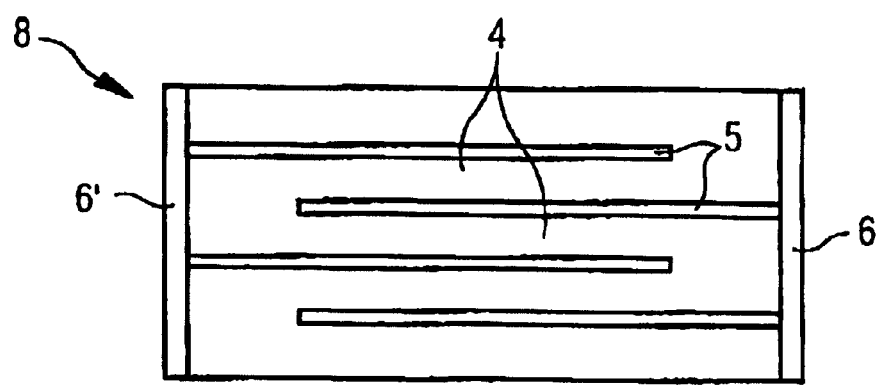
FIG. 2 depicts a multilayer component according to the invention in schematic cross-section.

Sintering transforms the individual green foil layers into a monolithic ceramic component body 8, which exhibits a solid bond among the individual ceramic layers 4. This solid bond also exists at the ceramic/electrode/ceramic points of connection. FIG. 2 depicts a finished multilayer component 8 of the invention in schematic cross-section. Alternating ceramic layers 4 and electrode layers 5 are stacked on top of one another in the component body. At two opposite points in the component body, collector electrodes 6, 6' are generated, each of which is in electric contact with every other electrode layer 5. To achieve this, a metal coating, generally consisting of silver on the ceramic material, can be produced, generally through currentless precipitation. This coating can subsequently be reinforced through electroplating, e.g., by applying an Ag/Ni/Sn coating sequence. This improves the material's capacity to be soldered onto printed circuit boards. However, other methods of metal coating and/or generation of collector electrodes 6, 6' are also suitable.

The component 8 depicted in FIG. 2 features ceramic layers as final layers on both main surfaces. To this end, for example, a non-imprinted green foil 1 can be incorporated into the foil stack as the top layer prior to sintering, so that the stack does not end with an electrode layer 2. For ceramic components that are subjected to particularly high levels of mechanical stress, it is also possible to design the uppermost and lowermost ceramic layers in the stack to be thicker than the remaining ceramic layers 4 in the stack. To this end, several non-imprinted green foils 1 without electrode layers can be incorporated as the uppermost and lowermost layers during stacking of the foil stack and then compressed and sintered together with the remaining green foil stack.

Figure 3:
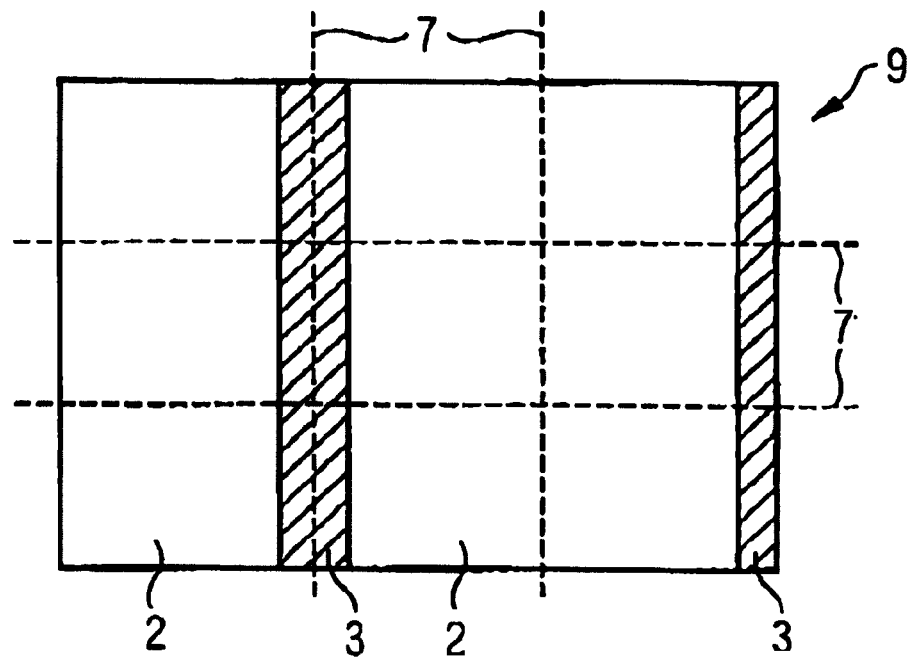
FIG. 3 depicts a ceramic green foil divisible into multiple components, with active and passive areas, in top view.

FIG. 3 depicts a green foil imprinted with an electrode pattern 2, which allows for a division into several components with progressively smaller surface areas. The passive areas 3 that are not imprinted with electrode paste are arranged in such a way that, through alternate stacking of first and second green foils, the alternating displacement of the electrodes suitable for bonding can be adjusted within the stack. This can be achieved if the first and second green foils are rotated relative to one another by 180°, for example, or if first and second green foils generally feature electrode patterns that are shifted relative to one another. The intersection lines 7 along which the green foil or the stack of layers made with the green foil can be separated into individual components are indicated by dashed lines. Electrode patterns are also possible in which the intersection lines used for separation can be designed in such a way that none of the electrode layers must be cut apart. In this case, however, every other electrode layer can be bonded beginning at the edge of the stack. If necessary, the stacks are additionally polished after separation and sintering and prior to application of the collector electrodes 6, 6', so as to expose the electrode layers to be bonded.

Figure 4:
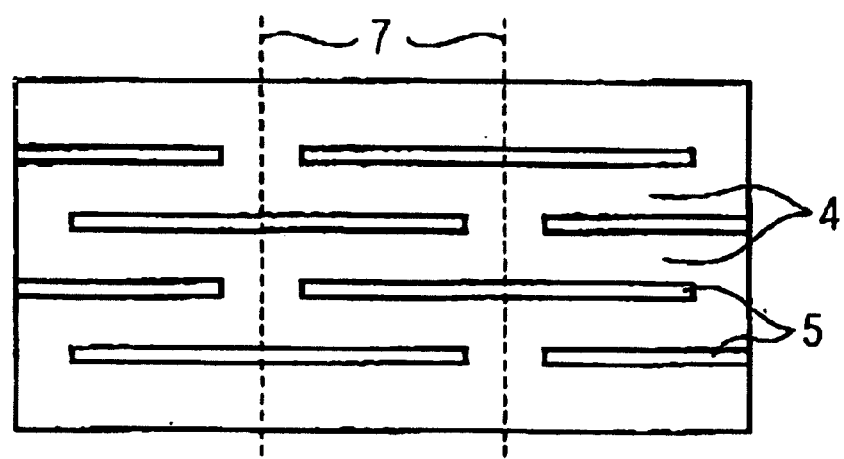
FIG. 4 depicts a stack of layers of ceramic green foil in cross-section.

FIG. 4 depicts a stack of layers produced in this manner, in schematic cross-section, which includes ceramic layers 4 and electrodes 5. It is evident that the separation of the stack of layers along the intersection lines 7 results in components, each of which exhibits the desired displacement of the electrodes 5. The division of such a foil stack comprising several component outlines into individual foil stacks having the desired component surface area is preferably accomplished prior to compression of the foil stack by means, for example, of cutting or punching. The foil stacks are subsequently sintered. However, it is also possible to initially sinter the foil stacks comprising several outlines of components, and then to separate the individual components by sawing apart the completely sintered ceramic material. Again, collector electrodes 6 are applied afterwards.

A multilayer component of the invention, which can be used as a posistor (PTC element), comprises a barium titanate ceramic material with the general composition (Ba, Ca,Sr,Pb)TiO$_3$, which is doped with donators and/or acceptors, such as manganese and yttrium.

The component can, for example, comprise 5 to 20 ceramic layers, including the corresponding electrode layers, but at least two interior electrode layers. The ceramic layers are normally 30 to 200 μm thick. However, they can also exhibit larger or smaller layer thicknesses.

Although an external dimension of a posistor element in the multilayer method of construction of the invention can vary, it normally falls within the range of a few millimeters commonly used with components that can be processed with SMD. A suitable size, for example, is structural shape 2220, which is commonly used with capacitors. However, the posistor element can also be even smaller.

The process for manufacturing ceramic multilayer components, which, with the exception of selection of the electrode material, is known in the art, could be described only in exemplary fashion on the basis of the exemplary embodiment. Consequently, the invention is not limited to the exemplary embodiments and can be modified further as desired by varying most of the parameters.

The invention is especially advantageous for the posistor components mentioned earlier, which, as a result of the invention, can be produced for the first time as stable multilayer components with small structural shapes and low resistance levels. However, it is also possible to produce other ceramic multilayer components with the invention, such as capacitors, high-temperature conductors, and varistors.

The invention claimed is:

1. A ceramic component having multiple layers, the ceramic component comprising:
   a stack of ceramic layers having internal electrodes; and
   collector electrodes connected to the stack;
   wherein the ceramic layers comprise PTC (Positive Temperature Coefficient) ceramic material and the internal electrodes comprise tungsten.

2. The ceramic component of claim 1, wherein the internal electrodes comprise at least two electrode layers in the stack.

3. The ceramic component of claim 1, further comprising:
   a top ceramic layer at a top of the stack; and
   a bottom ceramic layer at a bottom of the stack;
   wherein the top ceramic layer and the bottom ceramic layer do not have internal electrodes.

4. The ceramic component of claim 3, wherein at least one of the top ceramic layer and the bottom ceramic layer has a thickness that is greater than thicknesses of individual ceramic layers in the stack between the top ceramic layer and the bottom ceramic layer.

5. The ceramic component of claim 3, wherein each of the top ceramic layer and the bottom ceramic layer has a thickness that is greater than thicknesses of individual ceramic layers in the stack between the top ceramic layer and the bottom ceramic layer.

6. The ceramic component of claim 1, wherein the stack has a first side and a second side, a first collector electrode is connected to the first side, and a second collector electrode is connected to the second side.

7. The ceramic component of claim 6, wherein, in the stack, an internal electrode for a first ceramic layer connects to the first collector electrode but not to the second collector electrode, and an internal electrode for a second ceramic layer connects to the second collector electrode but not to the first connector electrode, the first ceramic layer and the second ceramic layer being adjacent in the stack.

8. The ceramic component of claim 1, wherein internal electrodes of adjacent ceramic layers in the stack connect to different collector electrodes.

9. The ceramic component of claim 1, wherein the collector electrodes comprise silver and electroplating.

10. The ceramic component of claim 1, wherein a thickness of a ceramic layer is between 30 μm and 200 μm.

11. The ceramic component of claim 1, wherein there are between five and twenty ceramic layers in the stack.

12. The ceramic component of claim 1, wherein the ceramic layers comprise one or more of Ba, Ca, Sr and Pb in combination with TiO$_3$, and the ceramic layers are doped with donators and/or acceptors, the donators and/or acceptors comprising at least one of manganese and yttrium.

13. The ceramic component of claim 1, wherein the internal electrodes are substantially parallel.

14. An SMD (Surface Mounted Device)-capable PTC (Positive Temperature Coefficient) resistor element, comprising:

a stack of ceramic layers having internal electrodes; and collector electrodes connected to the stack;

wherein the ceramic layers comprise PTC ceramic material and the internal electrodes comprise tungsten.

\* \* \* \* \*